Oct. 31, 1933.  J. A. BELL  1,932,569
FILTER
Filed July 3, 1931

James A. Bell,
INVENTOR

BY Victor J. Evans
and Co.  ATTORNEY

Patented Oct. 31, 1933

1,932,569

UNITED STATES PATENT OFFICE 1,932,569

FILTER

James A. Bell, Evansville, Ind.

Application July 3, 1931. Serial No. 548,644

1 Claim. (Cl. 210—182)

My present invention has reference to a dry cleaning apparatus and is especially directed to the gasoline filter therefor, and the primary object of the invention is the provision of an attachment for this type of filter which will remove all obstacles from the interstices of the metal pressure filtering screens in the filter, so that the filter will perform its function in a better and more effective manner than heretofore.

A further and important object is the provision of a filter attachment for this purpose by whose use a chemical is forced by steam in a fine spray into a chamber and forced by steam from the chamber into the filter to be forcibly directed through the reticulated metal pressure screens in the filter to remove from the interstices of the screen filter plates all foreign material that may have collected therein or thereagainst.

To the attainment of the foregoing the invention consists in the improvement hereinafter described and definitely claimed.

Figures 1, 2:
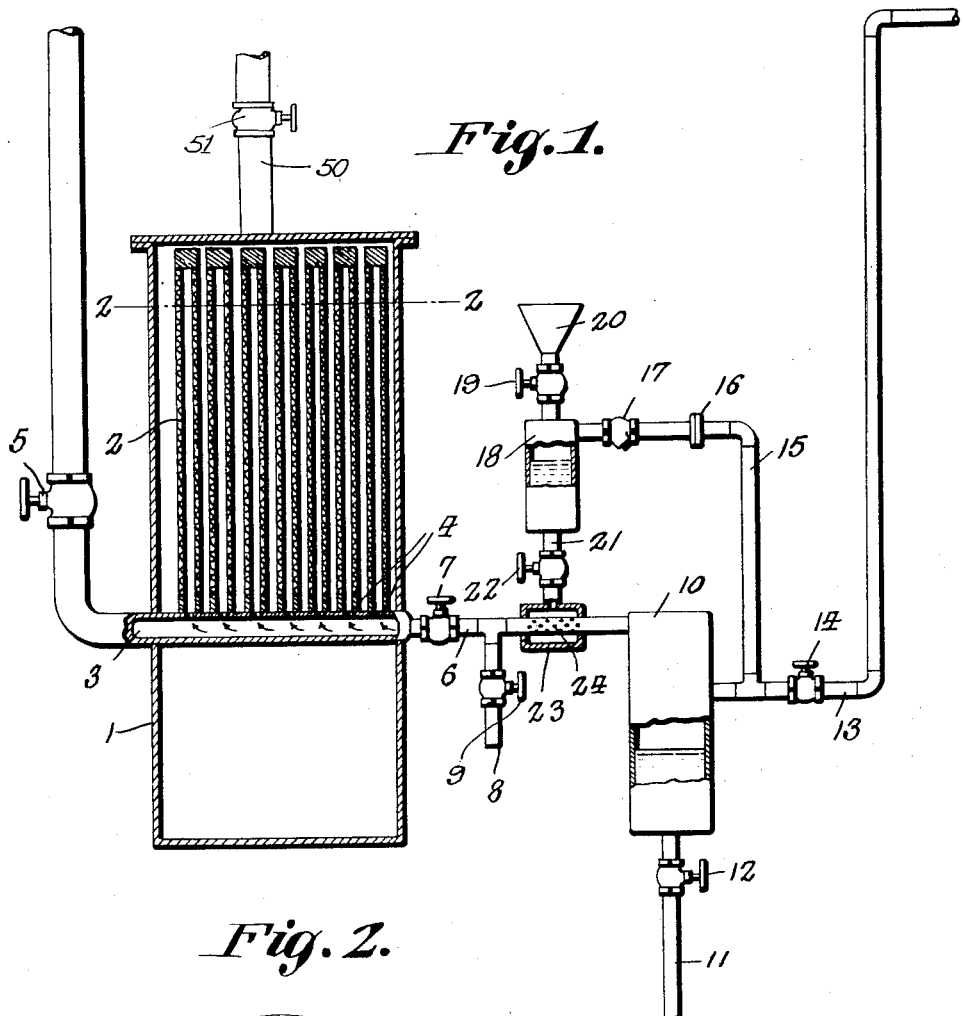
Figure 1 is a side elevation of the attachment in applied position with parts in section.
Figure 2 is a sectional view approximately on the line 2—2 of Figure 1.

In the drawing the numeral 1 designates the casing of a filter and 2 the reticulated metal pressure screens therein. The screens are arranged above the pipe member 3 that passes transversely through the filtering chamber and the said pipe, on its upper face, is provided with apertures 4 disposed between the filtering screens 2. The pipe provides the return gasoline pipe from the washer to the filter and the said pipe has its passage controlled by a hand operated valve 5. Only a sufficient portion of the filter is illustrated to disclose my attachment in connection therewith. The filter is of the ordinary screen pressure type into which gasoline is forced by pumps through the back or side and is carried upwardly and is discharged at the top of the screens so that the gasoline flows downwardly over the screens. The screens are made of two filtering sides and are hollow between these sides and have their edges and ends soldered or otherwise connected together so that the apertures 4 communicate with the respective hollow filtering screens. While not disclosed by the drawing the screens are arranged in sockets, and the gasoline must pass through the screens through the apertures 4 before entering the pipe 3 and the pipe 3 is connected to the washer of the dry cleaning apparatus. Dirty gasoline from the washer is conducted through a pipe 50 whose passage is controlled by a valve 51 and is discharged at the top of the screens and is forced downwardly so that the same enters the screens from the outside, leaving dirt, grease, soap, etc., on the outside of the filtering screens which flows through the openings to the inside of the screens downwardly through the small openings at the bottom of the screens and into the pipe 3 on to the washer.

It is the purpose of my attachment to cause the screens to be cleaned without scraping or without taking the screens out of the filter to steam them off and to likewise retain the screens in a good working condition and with little cost or trouble. My attachment does not work with the filteration in operation as the valve 5 is closed when the steam and chemicals carried by my attachment are forced up through the small openings in the bottom of the screens and by such force will push or cut off the dirt, grease, soap, etc., and cause the same to settle at the bottom of the filtering chamber 1.

Both ends of the pipe 3 pass through the filter 1 and one of these ends is normally closed by a steel plug. My attachment is secured to this end of the pipe. The plug is removed and in the said end of the pipe 3 I screw a smaller pipe 6, whose passage is controlled by a valve 7. Coupled to this pipe there is a downwardly directed pipe 8 whose passage is controlled by a valve 9, the valve being hand operated and the said valve and pipe 8 provide a safety device for the improvement. The valves 5 and 7 are closed. The pipe 6 communicates with the top of a water and steam separator which is in the nature of a hollow member and which is indicated in the drawing by the numeral 10. The bottom of the separator 10 has extending therefrom a drain pipe 11 whose passage is controlled by a hand operated valve 12. Below the connection of the pipe 6 to the separator 10 there is secured for communication with the said separator a pipe 13 through which steam under pressure is conducted and this pipe 13 has its passage controlled by a hand operated valve 14. Between the valve 14 and the separator 10 there is coupled to the pipe 13 a branch for a bypass 15 that includes a vertical and a horizontal member. The horizontal member or pipe is preferably in two sections, connected together by a union 16 and the said horizontal branch has arranged therein a check valve 17 to prevent back pressure of steam through the said pipe.

The horizontal branch of the pipe 15 is connected adjacent to the top of a chemical containing tank 18. The top of the tank has extending therefrom a pipe whose passage is controlled by a hand operated valve 19 and to the outer end of this pipe there is attached a funnel 20. The bottom of the chemical tank is also provided with a depending pipe that affords an outlet for the chemical in the tank and this pipe, indicated by the numeral 21, has its passage controlled by a hand operated valve 22. The pipe 21 communicates and is connected to a preferably cylindrical spray chamber 23, and the portion of the pipe 6 received in the chamber 23 is provided with a series of minute apertures 24.

The operation of the improvement may be described as follows: The valve 22, at the bottom of the chemical chamber or tank 18 is closed so that a sufficient supply of the chemical may be directed through the funnel into the tank. The valve 19 is then closed and the valve 12 at the bottom of the steam and water separator is opened. Thereafter the valve 14 is opened to permit steam to flow through the pipe 13 to permit of such steam passing into the water and steam separator, thereby draining all water from the separator. After the water has been drained from the steam and water separator 10 the valve 12 is closed and the valve 7 is opened which permits steam to pass through the pipes 6 and 3 into the filter 1 and through the screens 2 therein. The passage of steam is also directed through the pipe 15 which exerts a pressure on the chemical in the tank 18. By opening the valve 22 the chemical under pressure is delivered into the chamber 23 and will be forced through the apertures 24 into the pipe 6 in a small spray. This chemical is forced by the steam through the pipes 6 and 3 and is delivered in a fine spray through the apertures 4 and forced in a finger spray between and against the screens 2 in the filter, to effectively clean the screens in a expeditious manner.

It is believed the simplicity of the construction and the advantages thereof will be readily understood and appreciated by those skilled in the art to which such invention relates so that further detailed description will not be required. Obviously I do not wish to be restricted to the specific structure herein shown and described and, therefore, hold myself entitled to make such changes therefrom as fairly fall within the scope of what I claim.

Having described the invention, I claim:

An attachment having dry cleaning apparatus which includes a filter having a valve controlled pipe passing therethrough, metal filter screens in the filter above and resting on the pipe and said pipe having apertures arranged between the filter screens, said attachment comprising in combination, a valve controlled pipe connected with the first-named pipe, a water and steam separating chamber with which the last named pipe is connected, a valve controlled drain for the chamber, a valve controlled steam conducting pipe for introducing steam under pressure into the chamber, a chemical containing tank, a pipe having a check valve therein establishing a communication between the steam conducting pipe and the top of the tank, valve controlled pipes extending from the top and bottom of the tank, a funnel on the upper pipe, a chamber on the lower pipe surrounding the pipe, connected with the apertured pipe and with the water steam separator and said pipe at the portion thereof received in the chamber being apertured, a safety valve in the last-named pipe and a valve controlled drain pipe for the water and steam separator.

JAMES A. BELL.